No. 674,527. Patented May 21, 1901.
J. WAGNER.
SPECTACLES.
(Application filed July 14, 1900.)
(No Model.)
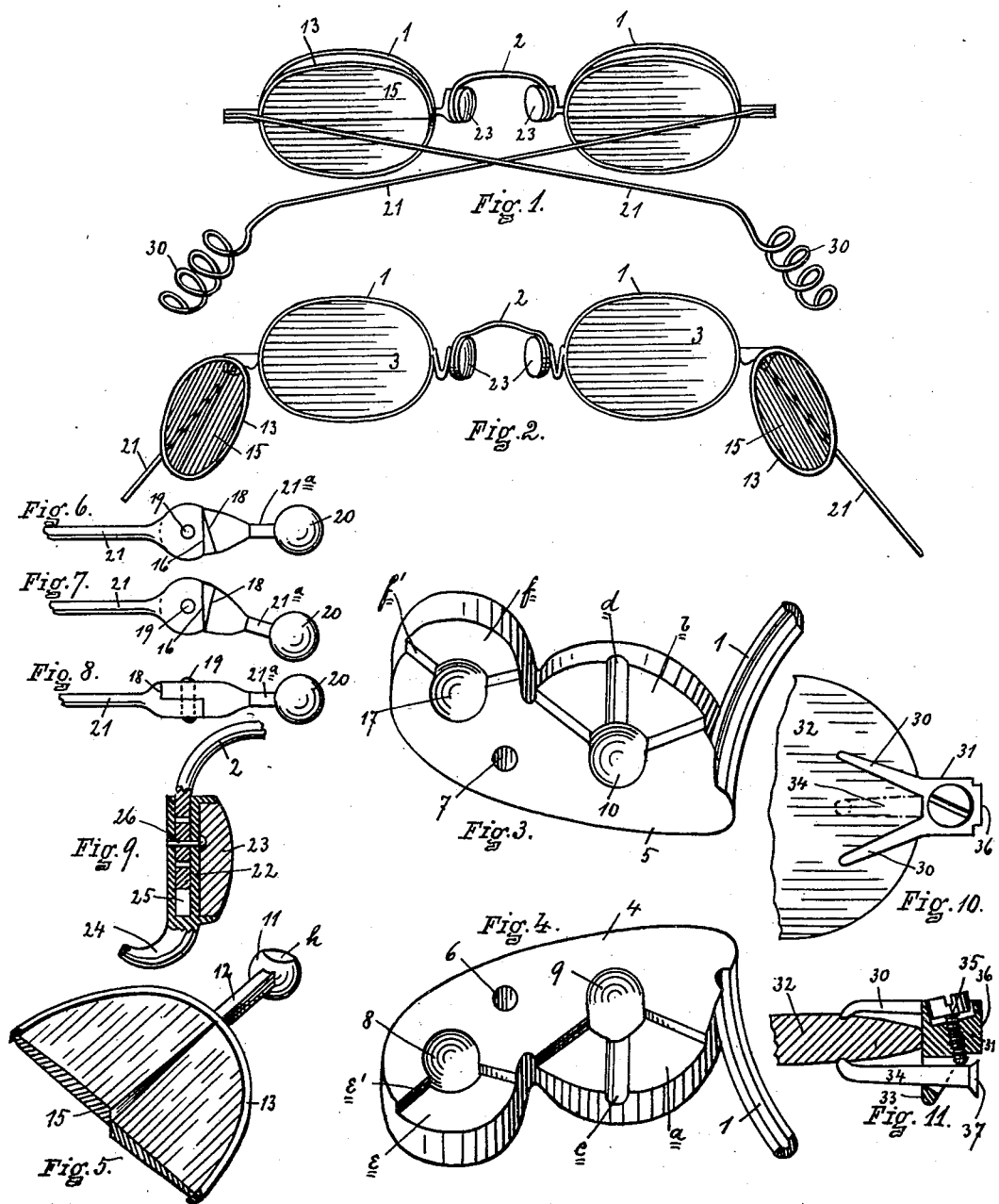

UNITED STATES PATENT OFFICE.

JOHN WAGNER, OF UTICA, NEW YORK.

SPECTACLES.

SPECIFICATION forming part of Letters Patent No. 674,527, dated May 21, 1901.

Application filed July 14, 1900. Serial No. 23,623. (No model.)

*To all whom it may concern:*

Be it known that I, JOHN WAGNER, of Utica, in the county of Oneida and State of New York, have invented certain new and useful Improvements in Spectacles; and I do hereby declare that the following is a full, clear, and exact description of the invention, which will enable others skilled in the art to which it appertains to make and use the same, reference being had to the accompanying drawings, and to the characters of reference marked thereon, which form part of this specification.

The object of my present invention is to provide improvements in spectacles, providing for adjustment of the lenses to meet varying conditions.

In the drawings, Figure 1 shows a perspective view of a pair of spectacles having my improvements. Fig. 2 shows a similar perspective view with the temples in open position for use and the extra or supplemental lenses in the out-of-use position. Figs. 3 and 4 show the upper and under parts, respectively, on a much enlarged scale, of the ears or projections of the spectacle-frames, which provide bearings for the temples and for the adjustable, reversible, and removable lenses. Fig. 5 shows an enlarged detail of the reversible removable supplemental lens-mount, together with the bearing which supports it in the frame. Figs. 6, 7, and 8 show side and plan views of a joint in the temple-pieces, permitting an adjustment of the angle of the lens to the eye, the former two figures showing the same in its two positions of adjustment. Fig. 9 shows in section details of the mechanism for adjusting the bridge-piece of the spectacles. Figs. 10 and 11 show in plan view and section details of a modified form of construction intended for use with lenses without frames.

Referring to the reference letters and figures in a more particular description, 1 1 indicate the main lens-frames, and 2 the bridge-piece, which is adjustably connected with the frames 1, as hereinafter pointed out. The frames 1 are adapted to receive the lenses 3. The frames are cut at one point and on the adjacent ends there is provided the ears 4 and 5, respectively. The ends of each lens-encircling frame are secured together, and the lens 3 is clamped in the frame by a screw passing through the openings 6 in the ear 4 and 7 in the ear 5. In the outer or projecting end of the ear 4 there is provided a half-socket 8, and between the socket 8 and the frame there is provided another half-socket 9. In the part 5 there is provided a half-socket 10, which corresponds with the half-socket 9 when the parts are in position and completes the socket. The socket, consisting of the parts 9 and 10, is adapted to receive the ball 11, arranged on the end of the shank 12 of the supplemental lens frame or mount 13. At one side of the socket part the ear 4 is cut down or recessed, as indicated at $a$, and the part 5 is similarly recessed or cut away, as indicated at $b$, affording, when the two parts are together, a slot of sufficient width to receive the shank 12 of the supplemental lens-frame and permitting the same to be moved from the position shown in Fig. 1 to that shown in Fig. 2. The square shank 12, received in said slotted opening, prevents the supplemental lens from being reversed except at an intermediate position between its limits of movement. This reversal is permitted by the further cut-away or grooved portion $c$ in the part 4 and $d$ in the part 5, which coincide when the parts are together. In order to allow the supplemental lens to be removed, the sides of the ball 11 are flattened, as shown at $h$, so that when in proper position the ball 11 can be removed from the socket through the opening formed by the recesses $a$ and $b$. It can also be replaced through the same opening. The supplemental lens 15, mounted in the frame 13, is preferably what is known as a "bifocal" lens, consisting of two half-lenses or a single lens ground to two different angles. In the part 5 there is a half-socket 17, which when the parts are together coincides with the half-socket 8. The socket formed of the parts 8 and 17 is adapted to receive the ball 20 on the bearing end of the temple 21. The shank portion $21^a$ of the temple passes through a recess formed by the cut-away portion $e$ in the ear 4 and the coinciding recess $f$ in the part 5. These two recesses $e$ and $f$ form a slotted opening, and the shank $21^a$ is preferably square, so as to prevent the rotation of the temple. The temple is provided with a pivotal joint 19, made to work quite tight and with considerable friction. The amount of movement at the joint 19 is limited by the shoulder 18 on the shank portion and the shoulder 16 on the main portion of the temple. A double set of these shoulders may be provided on each side of the joint, as shown. The arrangement of the shoulders is such as to limit the movement when the temple is in line with the shank, as shown in Fig. 6, as to the movement in one direction, and also to limit the same when a sufficient angle, as between the shank and temple, is secured, as indicated in Fig. 7. The slotted opening formed by the recesses e and f permit a swinging movement of the temple from the open position (shown in Fig. 2) to the closed position. (Shown in Fig. 1.) e' f' indicate the shoulders which limit the opening movement of the temples. The shoulders at the opposite side of the slot are not of much or any importance.

The nose-pads 23 are mounted upon a pad plate or base 22, secured to the frames of the lenses by a shank 24. In the pad-base there is provided a socket 25, which receives the end of the bridge 2. The end of the bridge 2 is provided with a series of openings, as shown, and is secured in one of its several positions of adjustment by a pin 26. The pin 26 is inserted from the pad side of the pad-base and is held in position by the pad, as shown.

The ends of the temples 21 are provided with an open coiled tip 30, which, taking a position behind the ear of the user, obtains a secure hold by reason of its form and provides for ventilation and is painless.

It will be observed that in use the supplemental lens can be thrown into the position shown in Fig. 1, so that both the supplemental and main lenses are before the eye of the user, or the supplemental lens can be thrown into the out-of-use position (shown in Fig. 2) or entirely removed. In addition to this, with the bifocal lens as a supplemental lens it can be reversed, so that the available half of the lens, which is the one used, may be brought into use to suit the convenience of the user. The joint in the temple-piece allows the angle of the spectacle-frames to be adjusted to the eye, also to suit the convenience of the user and place the lenses in position, so that the user can look directly and squarely through them and not at an angle.

In the modified form of construction shown in Figs. 10 and 11 a device is provided for engagement directly with the lens in case the surrounding frames of the lenses are dispensed with. This device consists of a pair of fingers 30 30, springing from a body 31 and adapted to engage one side of the lens 32. Passing through an opening in one side of the body 31 and engaging upon a fulcrum-point 33 is provided a lever 34, adapted to engage the opposite side of the lens 32. For gripping the lens between the fingers 30 and the lever 34 there is provided a set-screw 35, passing through the body 31 and engaging with the lever 34 at a point removed from the fulcrum 33. It will be observed that as the set-screw 35 is operated the end of the lever 34 may be made to press firmly on the lens 32. The lens may be slightly recessed at the point where the lever 34 engages in order to secure a better hold. The body 31 of the holding device may be attached at 36 to the bridge-piece of a pair of spectacles. In case the clamps are used with the spectacles, including temple-pieces, they may be attached at 37 to the head of the lever 34.

What I claim as new, and desire to secure by Letters Patent, is—

1. The combination in spectacles of the main frame, the reversible, supplemental frame or mount, a ball-and-socket joint connecting the main frame and supplemental frame, and means for permitting the reversal of the supplemental lens or mount, substantially as set forth.

2. In spectacles, the combination of the nose-pad base having a socket, and the adjustable bridge-piece having a removable pin securing the bridge-piece in the socket, and a pad securing the pin in position, substantially as set forth.

3. The combination in spectacles of the main frame, the reversible, supplemental lens frame or mounting, a ball-and-socket joint connecting the main frame and supplemental frame or mounting consisting of a ball having flattened sides and the socket having a recess a b and means for permitting the reversal of the supplemental lens frame or mounting, substantially as set forth.

4. The combination in a lens-clamp of the body 31, having the rigid, projecting fingers 30, 30, and the fulcrum 33, the clamping-lever 34 mounted on the fulcrum having its long arm arranged to engage the lens and a set-screw on the opposite side of the fulcrum from the lens arranged to engage the clamping-lever 34, substantially as set forth.

In witness whereof I have affixed my signature, in presence of two witnesses, this 12th day of July, 1900.

JOHN WAGNER.

Witnesses:
E. WILLARD JONES,
SARAH A. BROWN.